UNITED STATES PATENT OFFICE.

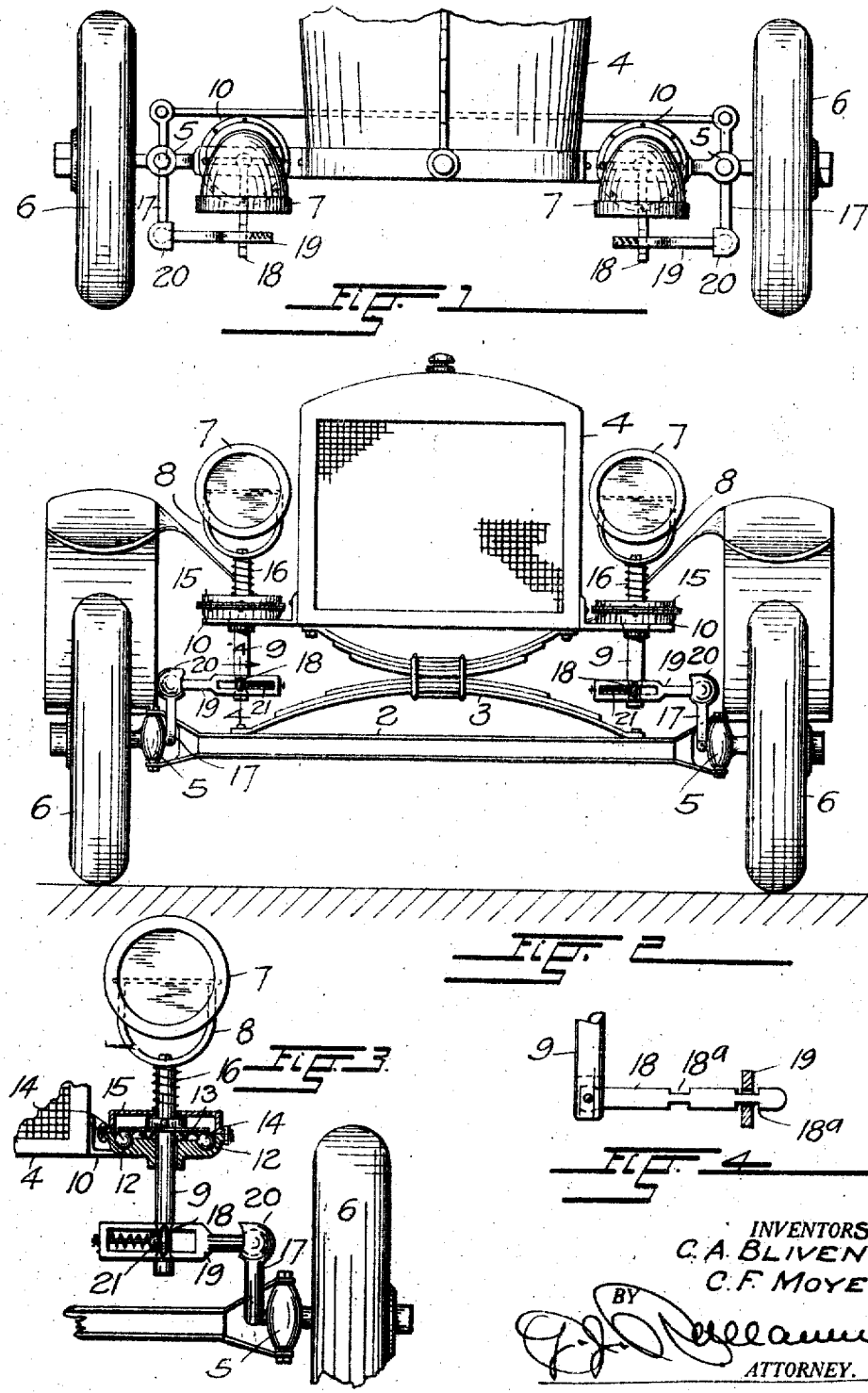

CHESTER A. BLIVEN AND CLARENCE F. MOYER, OF PUEBLO, COLORADO.

DIRIGIBLE HEADLIGHT FOR AUTOMOBILES.

1,408,068.

Specification of Letters Patent.   Patented Feb. 28, 1922.

Application filed April 26, 1920.   Serial No. 376,602.

*To all whom it may concern:*

Be it known that we, CHESTER A. BLIVEN and CLARENCE F. MOYER, citizens of the United States, residing at Pueblo, in the county of Pueblo and State of Colorado, have invented certain new and useful Improvements in Dirgible Headlights for Automobiles, of which the following is a specification.

This invention relates to dirigible headlights for automobiles and more particularly to improvements in mechanisms of the type in which the position of rotatably mounted headlights of a motor driven vehicle is controlled by the movement of the steering wheels of the same.

The broad object of a mechanism of the type above referred to is to cause the headlights of an automobile to throw their light directly in front of the vehicle when it is rounding curves as well as while it is moving in a straight path and in order to accomplish this object to better advantage it has been contemplated to provide a mechanism whereby only the headlight at the near side of the vehicle with relation to the direction in which it is turned, moves in conjunction with the steering wheels, while the other light remains in its normal position to throw its light upon the road directly forward of the vehicle.

The present invention relates particularly to controlling mechanisms of the last-described character and its objects is to provide certain new and useful improvements in the construction and arrangement of the devices by which the headlights of an automobile are movably mounted in conjunctive relation to the steering mechanism of the same which insure a positive dependable and efficient cooperation of the connected elements and provide for certain adjustments which still further increase the usefulness of the invention.

With the above objects in view our invention consists of the construction and arrangements of parts shown in their preferred form in the accompanying drawings in which similar characters of reference designate corresponding parts throughout the several views, and in which—

Figure 1 is a plan view of the forward portion of an automobile to which our invention is applied;

Figure 2, a front elevation of the same;

Figure 3, is an enlarged, partially sectional front elevation of one of the headlights in connection with the adjacent knuckle of the steering mechanism, and Figure 4, an enlarged section taken on the line 4—4, Figure 2.

Referring to the drawings the reference numeral 2 designates the front axle of a motor vehicle, and 4 the body which is supported thereon by means of the springs 3. The ends of the axle are forked to receive the pivoted steering knuckles 5 with which the front or steering wheels 6 of the vehicle are connected. The headlights 7 are mounted at each side of the body of the vehicle in stirrups 8 at the upper ends of standards 9 which are movably supported in brackets 10 projecting laterally from a convenient part of the body.

The brackets are to this end provided with ball races 12 and each standard carries a disk shaped collar 13 which rests upon a number of balls 14 in the respective race to reduce friction when the standard is turned about its axis.

Covers 15 secured upon the brackets exclude dust and dirt from the bearings and torsion springs 16 connected at one end to the lamp standards and at their other end to the covers of the bearings, serve to yieldingly maintain the headlights in their normal position in which their light is thrown directly forward of the moving vehicle.

It will be understood that while ball bearings of the character shown are most suitable for the purpose of mounting the headlights on the brackets, roller bearings or other anti-friction devices may be used to good advantage.

The lower ends of the standards projecting below the brackets, are connected with the steering knuckles at the corresponding ends of the axle by means of the following arrangement of cooperatively associated parts.

Arms 17 projecting forwardly and upwardly from the knuckles are immovably connected therewith by suitable means as for example a square stud driven into a correspondingly formed opening of the knuckle.

The standards have at their lower ends laterally extending crank arms 18 which are connected to the arms of the respective steering knuckles by links 19. The links are connected at one end to the arms 17 by ball-and-socket joints 20 and they are longitudinally slotted at their other ends to receive the ends of the crank arms.

The latter have to this end two or more sets of opposite notches 18ª which provide for their sliding connection with the slotted arms and permit of ready adjustment to vary the degree of rotation of the headlights by movement of the steering knuckles with which they are connected.

Spring-pressed abutments 21 in the slots of the links are provided to cushion the movement thereof and thereby relieve the headlights from jars and sudden shocks.

In the operation of our invention the link moving with the steering knuckle at the near side of the vehicle with relation to the direction in which it is turned, imparts a rotary movement to the headlight with which it is connected through the intermediary of the spring-pressed abutment, while the other link slides freely along the respective crank arm without changing the position of the headlight at that side of the vehicle.

It will be seen that while one of the headlights illuminates the road in the direction in which the vehicle is being turned, the other light throws its rays directly in front of the vehicle, and when the wheels of the vehicle are subsequently straightened, the torsion spring 16 returns the deflected light to its original position.

What we claim and desire to secure by Letters-Patent is:

1. The combination with a motor-vehicle and a steering knuckle thereof, of a headlight, a rotatably supported standard therefor, an arm projecting from the knuckle, a slotted link pivotally connected with said arm, a crank-arm on the standard having a sliding connection in the slot of the link, and a spring in said slot cushioning the movement of the crank-arm in one direction.

2. The combination with a motor vehicle and a steering knuckle thereof, of a headlight, a rotatably supported standard therefor, an arm projecting from the knuckle, a slotted link having a ball-and-socket connection with said arm, and a crank-arm on the standard having a sliding connection in the slot of the link.

3. The combination with a motor vehicle and a steering knuckle thereof, of a bearing on a relatively stationary part of the vehicle, a headlight, a supporting standard therefor, rotatably supported on the bearing, a torsion spring around the standard, to oppose its rotary movement in a given direction, an arm projecting from the knuckle, a crank-arm at the lower end of the standard, a transmission member between said arms, adapted for independent longitudinal movement relative to one of them, and a spring on the transmission member acting upon said arm.

In testimony whereof we have affixed our signatures.

CHESTER A. BLIVEN.
CLARENCE F. MOYER.